(No Model.)
J. W. DENNIS.
DENTAL CLAMP.
No. 532,723. Patented Jan. 15, 1895.
Fig: 1.
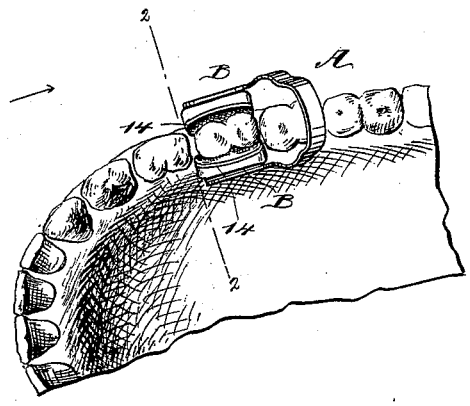
Fig: 3.
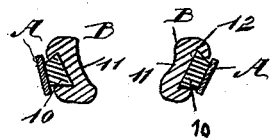
Fig: 4.
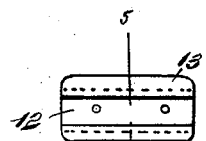
Fig: 2.
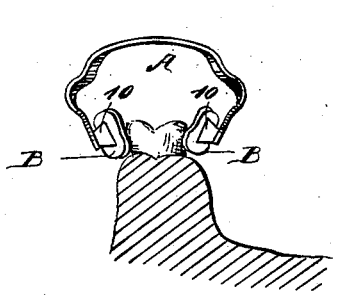
Fig: 5.
WITNESSES:
INVENTOR
J. W. Dennis
BY Munn & Co
ATTORNEYS.

UNITED STATES PATENT OFFICE.

JAMES W. DENNIS, OF CINCINNATI, OHIO, ASSIGNOR TO CLARA E. DENNIS, OF SAME PLACE.

DENTAL CLAMP.

SPECIFICATION forming part of Letters Patent No. 532,723, dated January 15, 1895.

Application filed July 3, 1894. Serial No. 516,438. (No model.)

*To all whom it may concern:*

Be it known that I, JAMES W. DENNIS, of Cincinnati, in the county of Hamilton and State of Ohio, have invented a new and Improved Dental Clamp, of which the following is a full, clear, and exact description.

My invention relates to dental clamps, and has for its object to so construct the body of the clamp that the jaws will be readily removable therefrom, enabling a number of jaws to be fitted to a single body, the jaws being in pairs and differently shaped in order that a tooth of peculiar formation, or having any degree of inclination may be accommodated.

A further object of the invention is to adjustably locate the jaws in the body of the clamp, enabling them to be accurately fitted to a tooth, and also to construct the bearings or inner faces of the jaws of a yielding material, such as soft rubber, enabling the clamp to be used upon extremely sensitive teeth without pain to the patient, or the peculiarly unpleasant feeling incident to the use of metallic jaws, and whereby further the gums will not be lacerated by the clamp.

The invention consists in the novel construction and combination of the several parts, as will be hereinafter fully set forth and pointed out in the claim.

Reference is to be had to the accompanying drawings, forming a part of this specification, in which similar figures and letters of reference indicate corresponding parts in all the views.

Figure 1 is a view representing a portion of the upper jaw, and the application of the clamp to one of the molars of said jaw. Fig. 2 is a section taken essentially on the line 2—2 of Fig. 1, illustrating the position that the jaws of the clamp assume upon the tooth to which they are applied. Fig. 3 is a vertical section through the members of the body of the clamp and through the jaws located thereon. Fig. 4 is a rear elevation of one of the jaws; and Fig. 5 is a transverse section, taken essentially on the line 5—5 of Fig. 4, illustrating a slight modification in the construction of the jaws.
The clamp may be said to consist of a body A and jaws B. The body A is preferably of yoke construction, or is more or less bowed, its curved or bowed section being at an angle to its members or legs, the latter being more or less horizontally placed. Upon the inner face of each member or leg of the clamp a rib 10 is produced, usually dove-tail shape in cross section, although said rib may be otherwise formed, and each of the ribs 10 is adapted to carry a jaw B. In Fig. 3 the jaw is shown as consisting of one piece, which may be either of moderately soft rubber, or a like material, or rubber more or less hardened, or a corresponding material. The inner upper faces of the jaws are concaved, as shown at 11, while their lower edges are more or less rounded off, but they may be, and sometimes preferably are, concaved in an outwardly direction.

The members or legs of the clamp converge at their lower edges. Therefore, the jaws, when placed upon the said legs or members, assume practically the same position. Upon the back of each jaw a recess 12, is produced, shaped in cross section to correspond to the cross sectional shape of the ribs 10 upon the body of the clamp. Thus it will be observed that the jaws are interchangeable, being removable from the body of the clamp, and furthermore, that when they are found to not exactly fit a tooth they may be adjusted laterally or horizontally in accordance with, for example, the inclination of the tooth.

In using the clamp upon a tooth of the upper jaw, one of the jaws of the clamp will engage with the buckle surface of the tooth and the other jaw with the palatal surface thereof; and when used in connection with a tooth on the lower jaw, one jaw of the clamp will engage with the buckle surface of the said tooth and the other jaw with the lingual surface, as shown in Figs. 1 and 2.

It will be observed that when the jaws of the clamp are in engagement with the tooth, the upper portion of the jaws is removed from the tooth to a predetermined extent, enabling access to be had to its side surfaces.

In Fig. 5 I have illustrated one of the preferred forms of jaw for the clamp, said jaw comprising a back 13 of hard rubber or like material, and in this back the recess 12 heretofore referred to is produced, while upon the inner face of the back a clamping or holding surface 14, is secured, the said surface being of a yielding material, as for example soft rubber; and the inner face of this surface of the jaw is likewise concaved, while the lower edge is either rounded off or concaved in an outwardly direction. It is evident that when jaws of this latter construction are applied to a tooth, the patient will not suffer pain or the inconvenience therefrom incident to the use of metallic jaws, even though the tooth be an exceedingly sensitive one, since the yielding surface of the clamp engaging with the tooth will produce no irritation, and the peculiarly unpleasant feeling of metal on the surface of the tooth is entirely dispensed with. Furthermore, the jaws of the clamp will not lacerate or irritate the gums in any manner.

It is evident that when a clamp is constructed in the manner above set forth, it is simple, durable and economic, and furthermore, that with one body portion any number of sets of jaws may be used, enabling each tooth engaged to be accurately fitted; and if by any possibility a jaw can not be found exactly suited to the tooth under treatment, the adjustment of the jaw upon the body will compensate for any such deficiency that may exist.

Having thus described my invention, I claim as new and desire to secure by Letters Patent—

A dental clamp, comprising a yoke-shaped body having forwardly projecting lower ends adapted to extend along the opposite sides of a row of teeth at right angles to the direction of length of said teeth, and provided with dovetail ribs on their inner faces, and jaws adapted to bind against the teeth and having on their outer faces dovetail recesses extending from end to end thereof and receiving the said ribs, whereby the jaws can be held to and movable longitudinally along the said ends of the body, substantially as described.

JAMES W. DENNIS.

Witnesses:
F. W. HANAFORD,
C. SEDGWICK.